(12) United States Patent
Oh

(10) Patent No.: US 11,922,970 B2
(45) Date of Patent: Mar. 5, 2024

(54) ELECTRONIC APPARATUS AND CONTROLLING METHOD THEREOF

(71) Applicant: SAMSUNG ELECTRONICS CO., LTD., Suwon-si (KR)

(72) Inventor: Hyungrai Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 364 days.

(21) Appl. No.: 17/439,663

(22) PCT Filed: Aug. 4, 2021

(86) PCT No.: PCT/KR2021/010299
§ 371 (c)(1),
(2) Date: Sep. 15, 2021

(87) PCT Pub. No.: WO2022/059911
PCT Pub. Date: Mar. 24, 2022

(65) Prior Publication Data
US 2023/0102049 A1    Mar. 30, 2023

(30) Foreign Application Priority Data
Sep. 17, 2020    (KR) .................. 10-2020-0120080

(51) Int. Cl.
G10L 25/78    (2013.01)
G10L 15/08    (2006.01)
G10L 15/20    (2006.01)

(52) U.S. Cl.
CPC .............. *G10L 25/78* (2013.01); *G10L 15/08* (2013.01); *G10L 15/20* (2013.01); *G10L 2015/088* (2013.01)

(58) Field of Classification Search
None
See application file for complete search history.

(56) References Cited

U.S. PATENT DOCUMENTS 8,713,542 B2    4/2014    Ativanichayaphong et al.
10,043,516 B2   8/2018    Saddler et al.
(Continued)

FOREIGN PATENT DOCUMENTS

JP    10-240291 A    9/1998
JP    2010-141468 A   6/2010
(Continued)

OTHER PUBLICATIONS

International Search Report and Written Opinion (PCT/ISA/210 and PCT/ISA/237) dated Nov. 12, 2021, issued by the International Searching Authority in International Application No. PCT/KR2021/010299.

*Primary Examiner* — Antim G Shah
(74) *Attorney, Agent, or Firm* — Sughrue Mion, PLLC

(57) ABSTRACT

A method for controlling an electronic apparatus is disclosed. The method for controlling an electronic apparatus includes detecting a voice input of a user; based on detecting the voice input of the user, performing voice recognition with respect to the voice input of the user; outputting information corresponding to a result of the voice recognition; identifying a type of ambient noise detected by the electronic apparatus; and changing an output state of the information corresponding to the result of the voice recognition based on the type of the ambient noise.

13 Claims, 9 Drawing Sheets

(56) References Cited

U.S. PATENT DOCUMENTS

| | | | |
|---|---|---|---|
| 10,049,662 | B2 | 8/2018 | Ha et al. |
| 10,726,845 | B2 | 7/2020 | Miura et al. |
| 2014/0136213 | A1 | 5/2014 | Kim et al. |
| 2016/0284351 | A1* | 9/2016 | Ha .......................... G10L 15/22 |
| 2018/0336275 | A1 | 11/2018 | Graham et al. |
| 2019/0198008 | A1 | 6/2019 | Guo et al. |
| 2019/0267020 | A1* | 8/2019 | Kim ..................... G10L 21/034 |
| 2020/0380958 | A1* | 12/2020 | Srinivasan .............. G06F 16/65 |
| 2021/0082421 | A1 | 3/2021 | Kim et al. |

FOREIGN PATENT DOCUMENTS

| | | |
|---|---|---|
| JP | 5405381 B2 | 2/2014 |
| JP | 2018-87872 A | 6/2018 |
| KR | 10-1131499 B1 | 3/2012 |
| KR | 10-2015-0103855 A | 9/2015 |
| KR | 10-2016-0115330 A | 10/2016 |
| KR | 1020190112684 A | 10/2019 |
| KR | 10-2020-0045311 A | 5/2020 |
| WO | 2020068593 A1 | 4/2020 |

* cited by examiner

ELECTRONIC APPARATUS AND CONTROLLING METHOD THEREOF

TECHNICAL FIELD

The disclosure relates to an electronic apparatus and a method for controlling thereof, and more particularly, to an electronic apparatus configured to perform voice recognition on a user voice input, and a method for controlling the same.

BACKGROUND ART

With the development of artificial intelligence (AI) technology, technologies related to virtual assistants (e.g., AI assistants or virtual assistants) are increasing. A "virtual assistant" refers to a software agent that processes tasks requested by a user, and provides specialized services to the user.

Particularly, as voice recognition technology develops, voice recognition technology is being combined with virtual assistants. Thus, electronic apparatuses that perform tasks or services desired by the user according to user voice inputs, and that provide a result of the performed tasks or services are gradually becoming more common.

Such an electronic apparatus may perform voice recognition on the user voice input, retrieve or reconstruct information according to the result of the user voice recognition, and provide the information to the user. In this process, there might be a problem in that users might have to repeat the process if there is ambient noise around the electronic apparatus or if the user is talking to another user and does not comprehend information provided by the electronic apparatus.

DISCLOSURE OF INVENTION

Technical Problem

Provided are an electronic apparatus configured to output response information based on a type of ambient noise, when ambient noise around the electronic apparatus is detected while performing an operation according to a user voice input to the electronic apparatus, and a method for controlling thereof.

Solution to Problem

According to an aspect of an embodiment, a method for controlling an electronic apparatus may include detecting a voice input of a user; based on detecting the voice input of the user, performing voice recognition with respect to the voice input of the user; outputting information corresponding to a result of the voice recognition; identifying a type of ambient noise detected by the electronic apparatus; and changing an output state of the information corresponding to the result of the voice recognition based on the type of the ambient noise.

The method may include, based on identifying the type of the ambient noise, stopping an output of the information corresponding to the result of the voice recognition; classifying output information that has been output and remaining information that has not been output from the information corresponding to the result of the voice recognition; and extracting a first keyword included in the output information based on keyword information. The changing the output state may include preventing output of the remaining information based on the first keyword.

The method may include extracting a second keyword included in the information corresponding to the result of the voice recognition based on the keyword information; and comparing the second keyword extracted from the information corresponding to the result of the voice recognition with the first keyword extracted from the output information. The changing the output state may include preventing the output of the remaining information based on the second keyword extracted from the information corresponding to the result of the voice recognition matching the first keyword extracted from the output information.

The method may include extracting a second keyword included in the information corresponding to the result of the voice recognition based on the keyword information; and comparing the second keyword extracted from the information corresponding to the result of the voice recognition with the first keyword extracted from the output information. The changing the output state may include summarizing and outputting the remaining information based on the second keyword extracted from the information corresponding to the result of the voice recognition not matching the first keyword extracted from the output information.

The method may include based on identifying the ambient noise as a noise of an external device, identifying a noise level of the external device. The changing the output state comprises amplifying an output level of the information corresponding to the result of the voice recognition based on the noise level of the external device being greater than or equal to a predetermined value.

The changing the output state may include, based on identifying that the ambient noise corresponds to a predefined noise requiring a response of the user, stopping the output of the information corresponding to the result of the voice recognition, and generating and outputting a guide message with respect to the ambient noise.

The changing the output state may include stopping the output of the information corresponding to the result of the voice recognition based on identifying that the ambient noise corresponds to a voice of another user. The method may include reproducing the information corresponding to the result of the voice based on a predetermined condition being satisfied.

The method may include predicting user response information with respect to the type of the ambient noise using an artificial model trained to output the user response information according to the type of the ambient noise. The changing the output state may include changing the output state of the information corresponding to the result of the voice recognition based on the predicted user response information.

The method may include identifying the ambient noise while performing the voice recognition with respect to the voice input of the user; and storing the information corresponding to the result of the voice recognition. The outputting may include outputting the information corresponding to the result of the voice recognition based on receiving a user input requesting reproduction of the information corresponding to the result of the voice recognition.

The method may include detecting the ambient noise; and distinguishing the voice input of the user and the ambient noise using a frequency analysis. The changing the output state may include summarizing the information corresponding to the result of the voice recognition and outputting the information based on the ambient noise being maintained.

According to an aspect of an embodiment, an electronic apparatus may include a microphone configured to detect sound; a speaker; and a processor configured to: detect a voice input of a user via the microphone; based on detecting the voice input of the user via the microphone, perform voice recognition with respect to the voice input of the user; control the speaker to output information corresponding to a result of the voice recognition; identify a type of ambient noise detected by the microphone; and change an output state of the information corresponding to the result of the voice recognition based on the type of the ambient noise.

The apparatus may include a memory configured to store keyword information. The processor may, based on identifying the type of the ambient noise, stop an output of the information corresponding to the result of the voice recognition, classify output information that has been output and remaining information that has not been output from the information corresponding to the result of the voice recognition, extract a first keyword included in the output information based on the keyword information. The processor, when changing the output state, may prevent output of the remaining information based on the first keyword.

The processor may extract a second keyword included in the information corresponding to the result of the voice recognition based on the keyword information; and compare the second keyword extracted from the information corresponding to the result of the voice recognition with the first keyword extracted from the output information. The processor, when changing the output state, may prevent an output of the remaining information based on the second keyword extracted from the information corresponding to the result of the voice recognition matching the first keyword extracted from the output information.

The processor may extract a second keyword included in the information corresponding to the result of the voice recognition based on the keyword information; and compare the second keyword extracted from the information corresponding to the result of the voice recognition with the first keyword extracted from the output information. The processor, when changing the output state, may summarize the remaining information and control the speaker to output the remaining information based on the second keyword extracted from the information corresponding to the result of the voice recognition not matching the first keyword extracted from the output information.

The processor may, based on identifying that the type of ambient noise is a noise of an external device, identify a noise level of the external device. The processor, when changing the output state, may control the speaker to amplify an output level of the information corresponding to the result of the voice recognition based on the noise level of the external device being greater than or equal to a predetermined value.

MODE FOR THE INVENTION

Figure 1A:
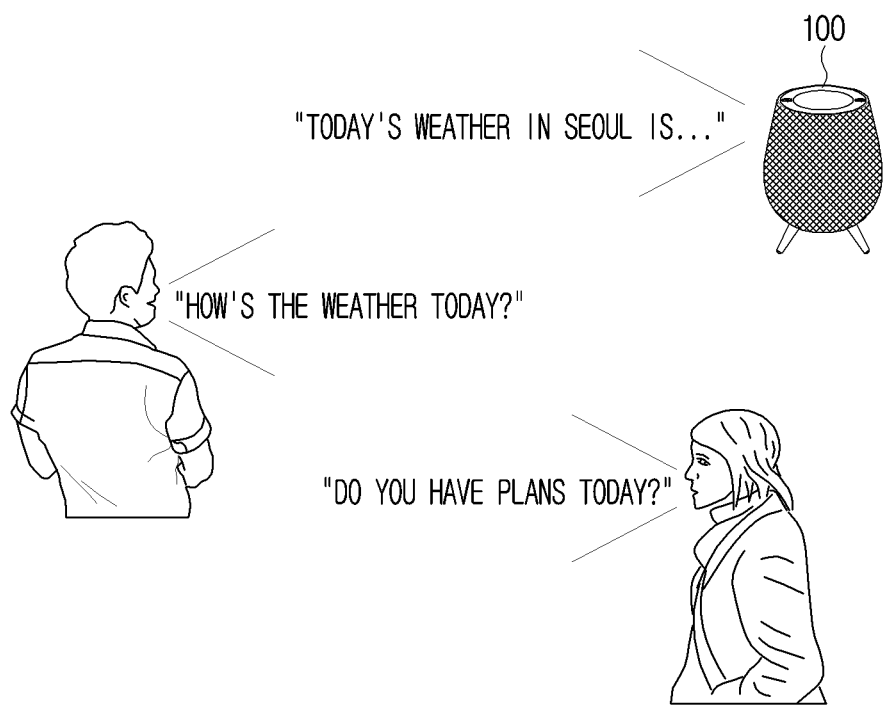
FIG. 1A is a view illustrating an electronic apparatus according to an embodiment.

Hereinafter, embodiments of the disclosure will be described in detail with reference to the accompanying drawings. However, it should be understood that the disclosure is not limited to the specific embodiments described herein, but includes various modifications, equivalents, and/or alternatives of the embodiments of the disclosure. In relation to explanation of the drawings, similar drawing reference numerals may be used for similar constituent elements.

The terms "have," "may have," "include," "may include," and the like, used in the embodiments of the disclosure indicate the presence of corresponding features (e.g., elements such as numerical values, functions, operations, or parts), and do not preclude the presence of additional features.

In the description, the phrase "A or B," "at least one of A or/and B," or "one or more of A or/and B" may include all possible combinations of the items that are enumerated together. For example, the phrase "A or B" or "at least one of A or/and B" may designate (1) at least one A, (2) at least one B, or (3) both at least one A and at least one B.

In the description, the terms "first," "second," etc., are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope as described herein, a first element may be referred to as a second element, or similarly, a second element may be referred to as a first element.

The terms "module," "unit," or "part" may be referred to as an element that performs at least one function or operation, and may be implemented with hardware, software, or a combination of hardware and software. In addition, a plurality of "modules," a plurality of "units," and a plurality of "parts" may be integrated into at least one module or chip except for a "module," a "unit," or a "part" which is implemented with specific hardware, and may be implemented with at least one processor.

When an element (e.g., a first element) is "operatively or communicatively coupled with/to" or "connected to" another element (e.g., a second element), an element may be directly coupled with another element or may be coupled through the other element (e.g., a third element). When an element (e.g., a first element) is "directly coupled with/to" or "directly connected to" another element (e.g., a second element), an element (e.g., a third element) may not exist between the other element.

In the description, the term "configured to" may be referred to, for example, as "suitable for," "having the capacity to," "designed to," "adapted to," "made to," or "capable of" under certain circumstances. The term "configured to (set to)" does not necessarily mean "specifically designed to" in a hardware level. Under certain circumstances, the term "device configured to" may refer to a "device capable of" performing an operation together with another device or components. For example, a processor configured to perform "A, B, and C" may be implemented by a dedicated processor for performing functions (e.g., an embedded processor) or a generic-purpose processor for performing functions by running one or more software programs stored in a memory device (e.g., a central processing unit (CPU) or an application processor (AP)), The terms used in the description are used to merely describe example embodiments, and do not limit the scope of other embodiments. Unless otherwise defined specifically, a singular expression may encompass a plural expression. All terms (including technical and scientific terms) used in the description could be used as meanings commonly understood by those ordinary skilled in the art to which the disclosure belongs. The terms that are used in the disclosure and that are defined in a general dictionary may have meanings that are identical or similar to the meanings of the terms from the context of the related art, and they are not interpreted ideally or excessively unless they have been clearly and specially defined. According to various circumstances, even the terms defined in various example embodiments of the disclosure should not be interpreted as excluding other example embodiments of the disclosure.

Also, the term "user" may refer to a person who uses an electronic apparatus or an apparatus (e.g., an AI electronic apparatus) that uses the electronic apparatus.

FIG. 1A is a view illustrating an electronic apparatus according to an embodiment.

An electronic apparatus 100 in FIG. 1A according to various embodiments of the disclosure may include, for example, at least one of a smart phone, a tablet personal computer (PC), a mobile phone, a video phone, an e-book reader, a desktop personal computer (PC), a laptop personal computer (PC), a net book computer, a workstation, a server, a personal digital assistant (PDA), a portable multimedia player (PMP), an MP3 player, a mobile medical device, a camera, and a wearable device. According to various embodiments, wearable devices may include at least one of accessories (e.g., watches, rings, bracelets, anklets, necklaces, glasses, contact lenses, or head-mounted-devices (HMD)), fabrics or clothing (e.g., electronic clothing), a body attachment type (e.g., a skin pad or a tattoo), or a bio-implantable circuit.

According to another embodiment, the electronic apparatus may be a home appliance. Home appliances include, for example, at least one of televisions, digital video disk (DVD) players, audio, refrigerators, air conditioners, vacuum cleaners, ovens, microwave ovens, washing machines, air cleaners, set-top boxes, home automation control panel, security control panels, TV boxes (e.g., Samsung HomeSync™, Apple TV™, or Google TV™), game consoles (e.g., Xbox™, PlayStation™, etc.), electronic dictionaries, electronic keys, camcorders, or electronic frames.

The electronic apparatus 100 may perform an AI assistant (virtual assistant) function to provide an operation or service requested by the user to the user. In this operation, the electronic apparatus 100 may receive a user input (e.g., a command, a query, an instruction, a request, a direction, a comment, etc.) for requesting a specific operation or service.

Specifically, the electronic apparatus 100 may receive the user voice input and perform voice recognition on the user voice input to provide an operation or service for the user voice input. For example, if the user voice input includes a request for executing a function of the electronic apparatus 100, the electronic apparatus 100 may perform voice recognition on the user voice input and perform the function of the electronic apparatus 100 requested by the user as a result of the voice recognition. Alternatively, if the user voice input includes a command for controlling another electronic apparatus, the electronic apparatus 100 may perform voice recognition on the user voice input, and as a result of the voice recognition, transmit a control command included in the user voice input to another electronic apparatus.

Alternatively, if the user voice input requests specific information, the electronic apparatus 100 may provide response information for the user voice input. Specifically, the electronic apparatus 100 may perform voice recognition on the user voice input, and based on identifying that the user voice input includes a query as a result of the voice recognition, the electronic apparatus 100 may retrieve and provide response information for the query. In this operation, the electronic apparatus 100 may provide response information for the user query via a voice output.

For this operation, the electronic apparatus 100 may include a dialogue system including a dialog manager (DM) module that provides responses to user queries included in the user's voice inputs, a natural language generator (NLG) module that converts the response information received from the dialog manager into text, a text to speech (TTS) module that converts data in the form text to data in the form of voice outputs, by using an automatic voice recognition (ASR) module that converts the user's voice input into text data, a natural language understanding (NLU) module that identifies the user's intention included in the user's voice input, and a knowledge base.

Contents related to the dialogue system are well-known technologies, and thus detailed descriptions will be omitted.

For example, as shown in FIG. 1A, when a user A asks a question such as "how is the weather today?," the electronic apparatus 100 may convert a user voice signal into a text form using an automatic voice recognition module, identify that the user's intention is a 'weather question' by using the NLU module, and search information on today's weather by using a conversation manager module. In addition, response information related to today's weather searched using the NLG module may be generated and provided to the user. In this operation, the electronic apparatus 100 may provide response information in the form of text, or may provide response information in the form of a voice output by converting the response information into a sound signal. When the response information is provided in the form of a voice output, the electronic apparatus 100 may convert the response information into data in the form of a voice output using the TTS module.

The electronic apparatus 100 may detect ambient noise around the electronic apparatus 100 in addition to the user voice. The ambient noise may be a sound other than the user voice or response information of the electronic apparatus 100, and may refer to various sounds generated around the electronic apparatus 100. For example, the ambient noise may include sounds of other people (e.g., user B), a sound of another electronic apparatus (e.g., a vacuum cleaner, a washing machine, etc.), a sound of a crying baby, a sound of cracking a window, a doorbell sound, or the like.

The electronic apparatus 100 may identify a type of detected ambient noise and change response information according to the user voice based on the identified type of the ambient noise.

For example, the electronic apparatus 100 generates information such as "Today's weather in Seoul is 25 degrees in the morning and 30 degrees in the afternoon. It is expected to be sunny all day, but depending on the region, there may be showers in the afternoon" in response to the user A's voice input of "How's the weather today?".

As shown in FIG. 1A, while the electronic apparatus 100 provides the user with the generated response information "Today's weather is Seoul is . . . ", based on detecting that the user B makes an utterance such as "Do you have plans today?" to the user A, the electronic apparatus 100 may recognize the user B's voice as ambient noise. In addition, the electronic apparatus 100 may summarize the response information as "the weather in Seoul today is expected to be sunny, but there may be showers in the afternoon" and provide it the user. In this case, the user A may obtain desired information from the electronic apparatus 100 while maintaining the conversation with the user B.

Although it has been described that the electronic apparatus 100 detects ambient noise in the process of outputting response information, the electronic apparatus 100 may detect the ambient noise around the electronic apparatus in the process of performing various operations.

Specifically, the electronic apparatus 100 may detect ambient noise during a wake-up operation for receiving the user voice input, performing the user voice recognition, and providing response information according to the user voice input. Here, the wake-up operation refers to a time frame between a time when a user voice input including a trigger word (e.g., "Hi Bixby") for activating the virtual assistant function of the electronic apparatus 100 is input to a time when a user voice input requesting a specific action or service (e.g., "How's the weather today?") is input.

In this case, the electronic apparatus 100 may identify an operation of the electronic apparatus 100 when ambient noise is generated, and may change response information according to the user voice input based on an operation state of the identified operation.

Although FIG. 1A illustrates that the electronic apparatus 100 includes a dialogue system, this is only an example, and an external device such as a server may include the dialogue system.

Figure 1B:
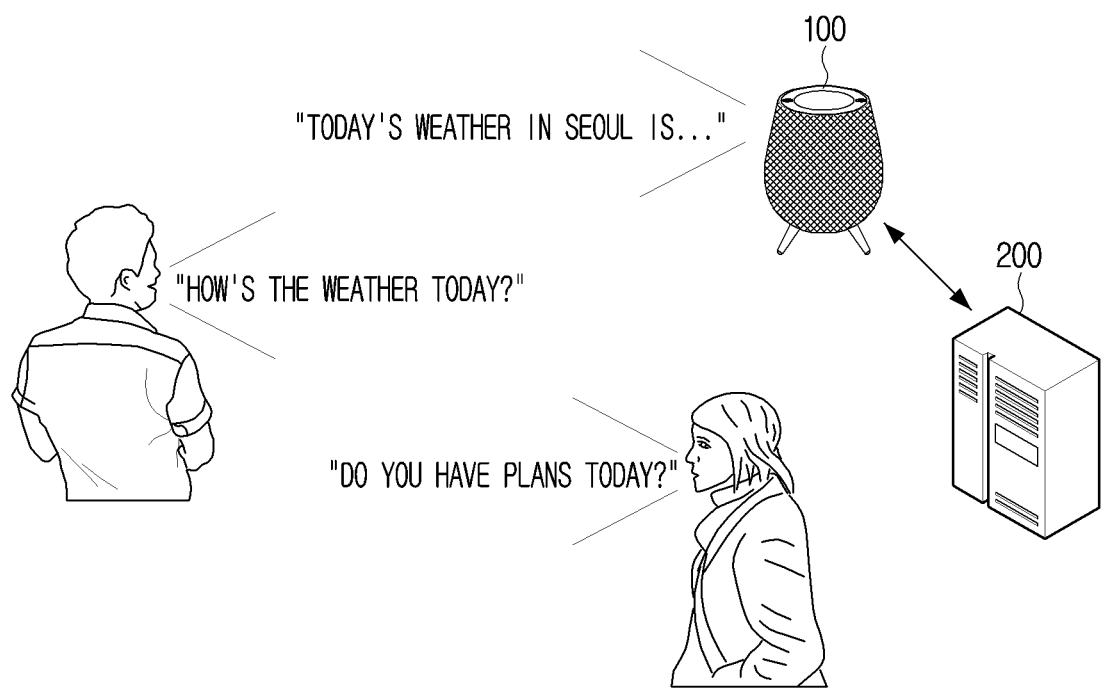
FIG. 1B is a view illustrating a system including an electronic apparatus and a server according to an embodiment.

FIG. 1B is a view illustrating a system including an electronic apparatus and a server according to an embodiment of the disclosure.

Referring to FIG. 1B, a system according to an embodiment of the disclosure may include an electronic apparatus 100 and a server 200.

The server 200 is a device capable of processing various requests received from the electronic apparatus 100, and may receive various information from the electronic apparatus 100 or transmit various information to the electronic apparatus 100. Specifically, the server 200 may receive a signal corresponding to a user voice input from the electronic apparatus 100 and transmit response information for the user voice input to the electronic apparatus 100.

For this operation, the server 200 may include a dialogue system. In this case, the electronic apparatus 100 may convert the user voice input into a user voice signal and transmit the user voice signal to the server 200, and the server 200 may perform voice recognition with respect to the user voice signal received from the electronic apparatus 100 by using the dialog system included in the server, generate response information according to a result of the voice recognition, and transmit the response information to the electronic apparatus 100.

The electronic apparatus 100 may receive response information from the server 200 as a result of voice recognition for the user voice input, and provide the received response information to the user.

Even if the server 200 includes a dialogue system, the electronic apparatus 100 may include a light weight dialogue system. The electronic apparatus 100 may recognize a simple user voice input using the light weight dialogue system. In addition, the electronic apparatus 100 may provide a guide message for ambient noise generated around the electronic apparatus 100 to the user using the light weight dialogue system or reprocess response information received from the server 200 to provide the response information to the user.

Specifically, when ambient noise is generated around the electronic apparatus 100, the electronic apparatus 100 may recognize user voice inputs in short sentences such as "stop for a second," "speak louder," "tell me again," or the like, by using a light weight automatic voice recognition system (ARS). Accordingly, the electronic apparatus 100 may control reproduction of response information received from the server 200 according to the user voice input.

In addition, the electronic apparatus 100 may identify ambient noise around the electronic apparatus 100, identify a type of ambient noise, and provide information with respect to the type of ambient noise to the user. Based on the type of ambient noise being identified as ambient noise that requires attention of the user, the electronic apparatus 100 may use a light weight W (NLG) module to generate a short sentence guiding the ambient noise such as "the child is crying," "the doorbell is ringing," or the like. Then, the electronic apparatus may provide the sentence generated by using a light weight text to speech (TTS) module to the user as a voice message.

Alternatively, as in FIG. 1A, based on ambient noise being detected, the electronic apparatus 100 may summarize and provide response information received from the server 200 based on the type of ambient noise or an operation state of the electronic apparatus when the ambient noise is generated.

As such, in a situation where it is difficult for the user to understand a long response output from the electronic apparatus 100 due to ambient noise, the electronic apparatus 100 may change and provide response information according to the user voice input, thereby enabling the user to efficiently obtain desired information.

In addition, a guide message for the ambient noise may be provided such that the user can quickly cope with the ambient noise.

Figure 2:
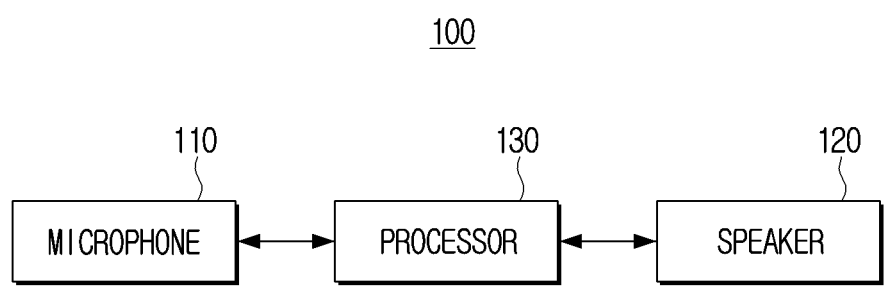
FIGS. 2 and 3 are block diagrams illustrating an electronic apparatus according to an embodiment.
Figure 3:
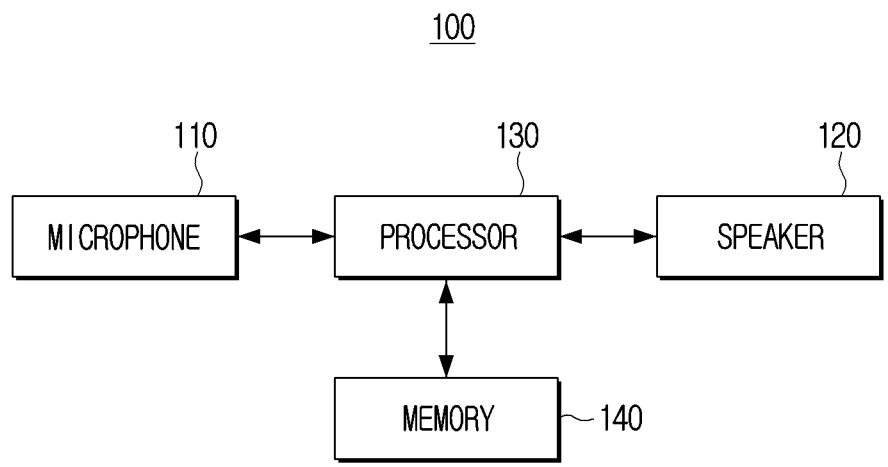

FIGS. 2 and 3 are block diagrams illustrating an electronic apparatus according to an embodiment of the disclosure.

As shown in FIG. 2, the electronic apparatus 100 may include a microphone 110, a speaker 120, and a processor 130.

The microphone 110 is a component for receiving sound externally from the electronic apparatus 100 and generating a signal corresponding to the received sound. Specifically, the microphone 110 may receive a user voice input and generate a user voice signal corresponding to the user voice input. In addition, the microphone 110 may receive ambient noise generated around the electronic apparatus 100 and may generate a signal corresponding to the received ambient noise.

The microphone 110 may include various configurations such as a microphone that collects analog sound (e.g., a user voice input or ambient noise), an amplifier circuit that amplifies the collected user voice input, an A/D conversion circuit that samples the amplified user voice input and converts the user voice input into a digital signal, a filter circuit for removing noise components from the converted digital signal, or the like.

A configuration for receiving sound may be implemented to be a microphone, but this is merely one of various embodiments of the disclosure and may be implemented as an input terminal capable of receiving a sound signal.

The speaker 120 is configured to output various kinds of alarm sounds or voice messages in addition to various audio data on which various processing operations such as decoding and amplification, are performed by the processor 130.

Particularly, the speaker 120 may output response information for a user voice input as a voice message in a natural language format. Alternatively, based on the electronic apparatus 100 detecting ambient noise and summarizing response information for the user voice input, the speaker 120 may output the summarized response information as a voice message in the natural language format.

A configuration for outputting audio may be implemented to be a speaker; however, this is merely one of various embodiments of the disclosure and may be implemented as an output terminal capable of outputting audio data.

The processor 130 may be electrically connected to a memory to control overall operations and functions of the electronic apparatus 100. For example, the processor 130 may control hardware components or software elements connected to the processor 130 by driving the operating system (O/S) or an application program and process or compute various data. Further, the processor 130 may load and process a command or data received from at least one of the other components to a volatile memory and store diverse data in a non-volatile memory.

For this operation, the processor 130 may be implemented by a dedicated processor for performing functions (e.g., an embedded processor) or a generic-purpose processor for performing functions by running one or more software programs stored in a memory device (e.g., a CPU or an AP).

In the disclosure, the processor 130 may be implemented as a digital signal processor (DSP) that processes digital signals, a microprocessor, and a time controller (TCON). However, the disclosure is not limited thereto, and may include at least one of a CPU, a micro controller unit (MCU), a micro processing unit (MPU), a controller, an AP, and a graphics-processing unit (GPU) or a communication processor (CP), and an address resolution protocol (ARP) processor, or may be defined with a corresponding term. In addition, the processor 130 may be implemented as a system on chip (SoC) or large scale integration (LSI) in which a processing algorithm is embedded, or may be implemented in a field programmable gate array (FPGA) form.

The processor 130 may detect a user voice input uttered by the user through the microphone 110. Specifically, the processor 130 may detect the user voice input by receiving a signal corresponding to the user voice input via the microphone 110.

In addition, the speaker 120 may be controlled to output information corresponding to a result of voice recognition by performing voice recognition on the user voice input. In the disclosure, information corresponding to the result of the voice recognition may mean response information to a query included in the user voice input.

In other words, when the user voice input includes a request for specific information, the information corresponding to the result of the voice recognition may refer to response information for specific information included in the user voice input.

The processor 130 may detect ambient noise around the electronic apparatus 100 in a series of processes of receiving a user voice input and performing voice recognition on the user voice input to output information corresponding to a result of the voice recognition.

Specifically, the processor 130 may identify ambient noise around the electronic apparatus 100 using the microphone 110. The processor 130 may receive a sound signal generated around the electronic apparatus 100 via the microphone 110 and identify ambient noise from the received sound signal.

For example, when ambient noise is detected in the process of receiving a user voice input, the processor 130 may identify the ambient noise by filtering a noise signal included in the user voice signal. Alternatively, the processor 130 may control the microphone 110 to detect sound around the electronic apparatus 100 while performing user voice recognition or outputting information corresponding to the result of the user voice recognition, and identify the ambient noise around the electronic apparatus 100 obtained from the microphone 110.

The processor 130 may identify the type of ambient noise based on frequency analysis of a signal corresponding to the ambient noise. For example, the processor 130 may perform frequency analysis by extracting features such as amplitude and period of the ambient noise signal, and identify whether the ambient noise corresponds to a voice of another user, whether the ambient noise corresponds to a sound generated by another electronic apparatus, or whether the ambient noise corresponds to a sound generated in a situation that requires an immediate action of the user, such as a baby's cry or the sound of a window breaking.

Alternatively, the processor 130 may identify the type of ambient noise using an AI model. Specifically, the processor 130 may identify ambient noise around the electronic apparatus 100 using an AI model trained to identify the type of sound. For this operation, the electronic apparatus 100 may include an AI model trained to identify the type of sound by receiving sound input via the microphone 110.

The processor 130 may change an output state of information corresponding to a result of the voice recognition based on the identified type of ambient noise. Specifically, the processor 130 may change an output state of information corresponding to the result of the voice recognition such as stopping the output of information corresponding to the result of the voice recognition according to the type of the identified ambient noise, outputting a summary of information corresponding to the result of the voice recognition, amplifying output sounds including information corresponding to the result of the voice recognition, or outputting information regarding the ambient noise instead of information corresponding to the result of the voice recognition.

The processor 130 may identify an operation state of the electronic apparatus when ambient noise is generated. Specifically, when the ambient noise is generated, the processor 130 may identify whether the electronic apparatus 100 is in a standby state of receiving a user voice input, receiving the user voice input, performing a voice recognition for the user voice input, or providing response information according to the user voice input.

In addition, the processor 130 may change the output state of information corresponding to the result of the voice recognition based on the operation state of the electronic apparatus at the time the ambient noise is generated.

A detailed operation of the processor 130 will be described in detail with reference to FIGS. 4 to 7.

At least one of the elements illustrated in the electronic apparatus 100 of FIG. 2 may be added, changed, or deleted according to the performance and/or type of the electronic apparatus 100. In addition, it should be understood by those skilled in the art that locations of the elements may be changed based on the performance or configuration of the electronic apparatus 100.

For example, as illustrated in FIG. 1B, when the server 200 includes a dialogue system and performs voice recognition on the user voice input in the server 200, the electronic apparatus 100 may include a communication interface for performing communication with the server 200.

The communication interface includes a wireless fidelity (Wi-Fi) module, a Bluetooth module, an infrared communication module, and a wireless communication module. Each communication module may be implemented in the form of at least one hardware chip.

Especially, the Wi-Fi chip and Bluetooth chip each perform communication in the Wi-Fi method, and Bluetooth method, respectively. If the Wi-Fi module or the Bluetooth module is used, various kinds of connection information such as a service set identifier (SSID), a session key and the like, is transmitted and received first, and after establishing communication, various kinds of information may be transmitted and received.

An infrared communication module performs communication according to an infrared data association (IrDA) technology that wirelessly transmits data in a short distance using infrared rays between visible and millimeter waves.

In addition to the communication methods described above, the wireless communication module may include at least one communication chip that performs communication according to various wireless communication standards such as ZigBee, 3rd generation (3G), 3rd generation partnership project (3GPP), long term evolution (LTE), LTE Advanced (LTE-A), 4th generation (4G), 5th generation (5G), and the like.

In addition, the communication interface may include at least one of wired communication modules that perform communication using a local area network (LAN) module, an Ethernet module, a pair cable, a coaxial cable, an optical fiber cable, or a Ultra Wide-Band (UWB) module.

According to another embodiment, the electronic apparatus 100 may further include a memory 140 as illustrated in FIG. 3.

The memory 140 is configured to store various programs and data for operating the electronic apparatus 100.

The memory 140 may be implemented as an internal memory such as a read only memory (ROM) (e.g., an electrically erasable programmable read-only memory (EEPROM)) or a random access memory (RAM) included in the processor 130, or may be implemented as a separate memory. In this case, the memory 140 may be implemented in a form of a memory embedded in the electronic apparatus 100 or may be implemented in a form of a memory that is detachable to the electronic apparatus 100 according to a data storage purpose. For example, data for driving the electronic apparatus 100 may be stored in a memory embedded in the electronic apparatus 100, and data for an extended function of the electronic apparatus 100 may be stored in a memory attached to and detached from the electronic apparatus 100.

A memory embedded in the electronic apparatus 100 may be implemented as at least one of a volatile memory (e.g., dynamic RAM (DRAM), static RAM (SRAM), or synchronous dynamic RAM (SDRAM)), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g. NAND flash or NOR flash, etc.)), a hard drive, or a solid state drive (SSD), and a memory that is detachable to the electronic apparatus 100 may be implemented as a memory card (e.g., compact flash (CF), secure digital (SD), micro secure digital (Micro-SD), mini secure digital (Mini-SD), extreme digital (xD), multi-media card (MMC), etc.), external memory that can be connected to a USB port (e.g., USB memory) or the like.

The memory 140 may include an NLG abstraction module that summarizes response information generated as a result of user voice recognition generated through the NLG module. The NLG abstraction module may generate summary information by extracting a keyword from response information generated through the NLG module of the dialogue system, and summarizing the response information based on the extracted keyword.

For this operation, keyword information for each domain may be pre-stored in the memory 140. In the disclosure, a domain refers to a field related to a user voice input or response information to the user voice input. For example, when the user utters "How is the weather today?", the domain for the user's uttered voice may be "weather."

In addition, the memory 140 may store an AI model trained to output user response information according to the type of ambient noise. In this case, the AI model may be updated by using the type of ambient noise generated while driving the electronic apparatus 100 and the user's response information to the ambient noise.

Alternatively, according to another embodiment, the type of ambient noise and response information of the user according to the type of ambient noise may be stored. Specifically, the memory 140 may store user response information for a voice recognition result output when the ambient noise is generated according to the type of ambient noise. For example, when ambient noise from an external device such as a vacuum cleaner is generated in the process of providing the voice recognition result, if the user amplifies the sound of the voice information rather than summarizing the result of the voice recognition, information on the user response such as "a step of outputting voice recognition result-vacuum cleaner sound-sound amplification" may be stored in the memory 140.

Figure 4:
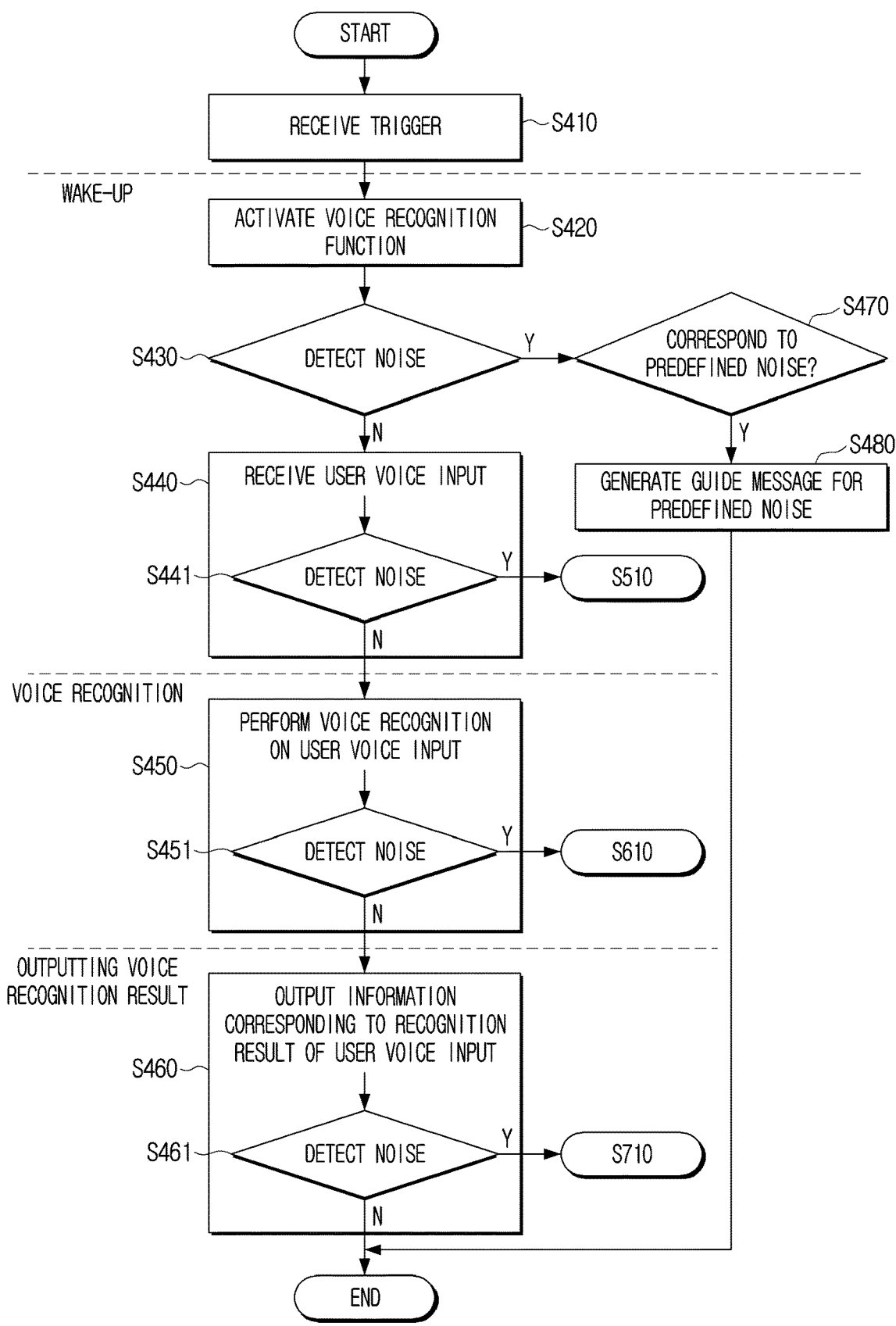
FIG. 4 is a flowchart illustrating an operation of an electronic apparatus according to an embodiment.

FIG. 4 is a flowchart illustrating an operation of an electronic apparatus according to an embodiment of the disclosure.

The processor 130 may receive a voice input of a trigger (operation S410). The trigger refers to a user voice input including a trigger word (e.g., "Hi, Bixby", "Hey Siri", etc.) for activating the virtual assistant function of the electronic apparatus 100.

Based on receiving the trigger, the processor 130 may activate the virtual assistant function. Particularly, since the user voice input uttered by the user may be received as an input of the virtual assistant function, the processor 130 may activate the voice recognition function (operation S420). In this operation, the processor 130 may control the microphone 110 to detect sound generated around the electronic apparatus 100.

The processor 130 may detect the ambient noise before receiving the user voice input via the microphone 110 (operation S430-Y). In this case, the detected sound is not a user voice input, but is a non-verbal sound, which may be generated in a situation that requires immediate operation of the user, such as a driving sound of another electronic apparatus (e.g., a vacuum cleaner, a washing machine, a fan, etc.) or a doorbell sound.

The processor 130 may identify ambient noise detected through the microphone 110. Specifically, the processor 130 may identify the type of ambient noise through frequency analysis of a noise signal, or may identify the type of ambient noise by using an AI model trained to identify the type of sound.

Then, the processor 130 may determine whether the detected ambient noise corresponds to a predefined noise (operation S470). The predefined noise is a noise generated in a situation requiring an immediate response (or operation) of the user, such as a crying child, a sound of glass breaking, and a sound of a doorbell. For this operation, information regarding the predefined noise may be pre-stored in the memory 140.

When the detected ambient noise corresponds to the predefined noise, the processor 130 may generate a guide message for the generated predefined noise (operation S480). Specifically, the processor 130 may generate a guide message for a predefined noise using an NLG module (or a light weighted NLG module) of a dialogue system, and use a TTS module (or a light weighted TTS module) of the dialogue system, such that the generated guidance message may be converted into a voice message. In addition, the processor 130 may control the speaker 120 to output the converted voice message.

If ambient noise is detected before receiving the user voice input (operation 5430-Y), the processor 130 may increase a sensitivity of the microphone 110 in order to recognize a user voice input because the user voice input may not be accurately recognized due to ambient noise around the electronic apparatus 100.

The processor 130 may receive a user voice input (operation S440). Specifically, the processor 130 may receive a voice signal corresponding to the user voice input via the microphone 110. The user voice input represents a user uttered voice input requesting a specific function or service of the electronic apparatus 100.

In this case, the processor 130 may detect ambient noise together with the user voice input (operation S441-Y). Specifically, when ambient noise is generated around the electronic apparatus 100 when the user utters a voice input, the processor 130 may simultaneously receive a user voice signal and a noise signal via the microphone 110.

Figure 5:
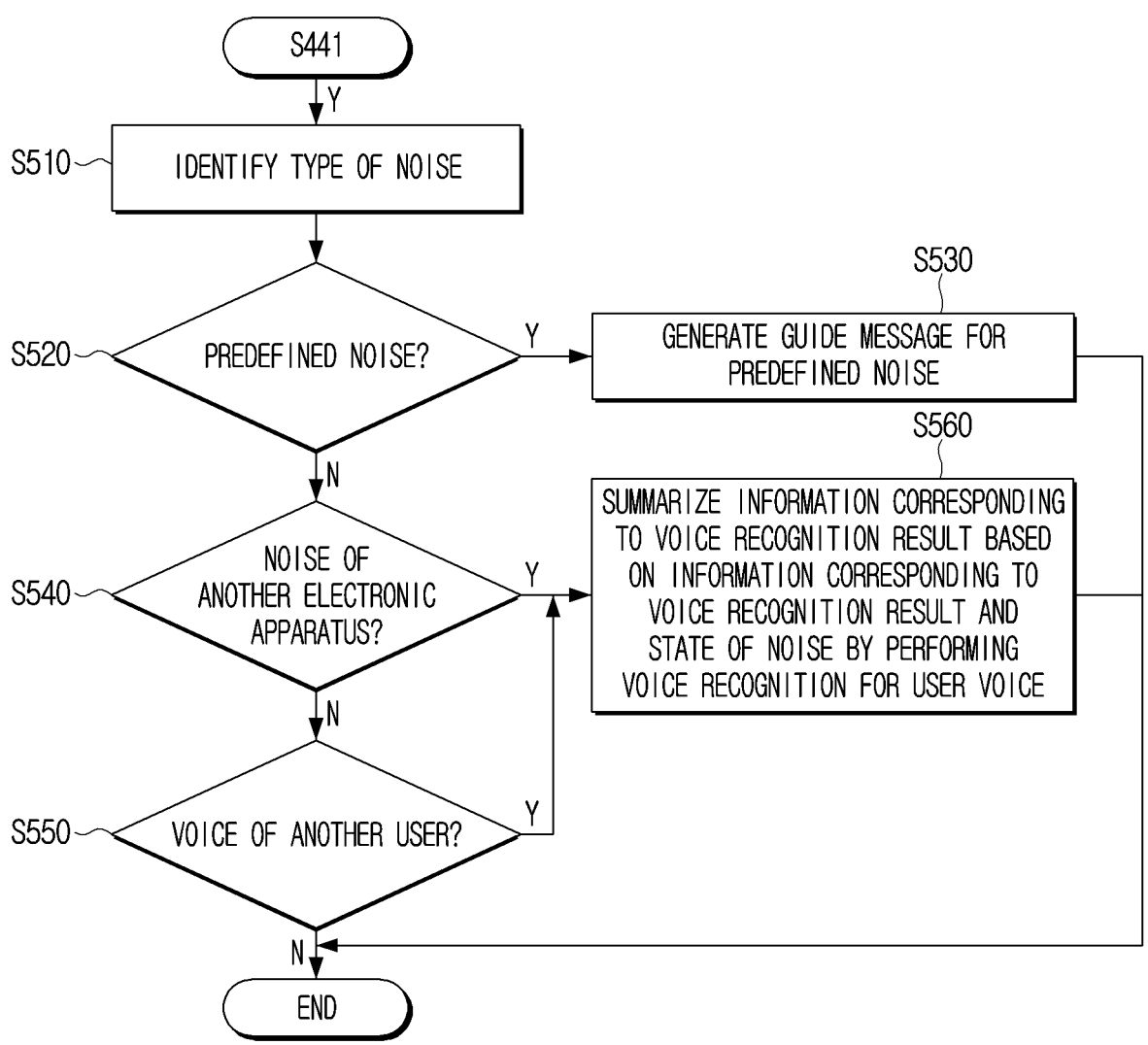
FIG. 5 is a flowchart illustrating an electronic apparatus that detects ambient noise in a process of receiving a user voice input according to an embodiment.

In this regard, FIG. 5 is a flowchart illustrating an electronic apparatus that detects ambient noise in a process of receiving a user voice input according to an embodiment of the disclosure.

Referring to FIG. 5, the processor 130 may identify the type of ambient noise (operation S510). Specifically, the processor 130 may perform noise filtering through frequency analysis of a signal received via the microphone 110 and may distinguish between a user voice signal and a noise signal.

Further, the processor 130 may identify the type of ambient noise through frequency analysis of the noise signal (operation S510).

The processor 130 may identify whether the ambient noise corresponds to a predefined noise (operation S520). As described above in FIG. 4, the predefined noise may include noise generated in a situation requiring an immediate response (or action) of the user.

Based on identifying that the detected ambient noise corresponds to the predefined noise (operation S520-Y), the processor 130 may generate a guide message for the generated predefined noise (operation S530). This operation may be substantially similar with operation S480 of FIG. 4, such that a detailed description will be omitted.

Based on identifying that the identified ambient noise is not a predefined noise (S520-N), the processor 130 may identify whether the identified ambient noise corresponds to a sound of another electronic apparatus (operation S540). Here, the sound of another electronic apparatus may include not only a sound generated while another electronic apparatus performs its original function, such as a motor sound from a vacuum cleaner or a TV output sound, but a voice message output by another electronic apparatus while performing an AI function. In this case, the former sound may be maintained for a relatively longer time, but the latter sound may be terminated within a relatively short time.

Based on identifying that the identified ambient noise corresponds to the sound of another electronic apparatus (S540-Y), the processor 130 may perform voice recognition on the user voice input and obtain information corresponding to the voice recognition result. As described above with reference to FIG. 3, information corresponding to the result of voice recognition in the disclosure may refer to response information to a query included in the user voice input. In other words, when the user voice input includes a request for specific information, the information corresponding to the voice recognition result may refer to response information for specific information included in the user voice input.

The processor 130 may summarize information corresponding to the voice recognition result based on a state of ambient noise (operation S560). Specifically, when a sound of another electronic apparatus is maintained even after performing voice recognition on the user voice input and obtaining information corresponding to the voice recognition result, the processor 130 may summarize information corresponding to the result of the voice recognition. In addition, the processor 130 may control the speaker 120 to output summarized information.

in the operation of receiving the user voice, when ambient noise from another electronic device is detected, but ambient noise from another electronic device is not detected after performing voice recognition on the user's voice and obtaining information corresponding to the voice recognition result, the processor 130 may output information corresponding to the obtained voice recognition result.

According to another embodiment, when the ambient noise is a sound of another electronic apparatus, the processor 130 may identify a level of the ambient noise generated by another electronic apparatus and control the speaker 120 to amplify a level output of the electronic apparatus 100 based on the level of the identified ambient noise. Specifically, the processor 130 may control the speaker 120 to amplify an output level of information corresponding to the voice recognition result of the user to prevent a problem that when the level of the identified ambient noise is greater than or equal to a predetermined value, a sound of information corresponding to the voice recognition result output from the electronic apparatus 100 is not heard due to the sound of another electronic apparatus Based on identifying that the identified ambient noise is not the sound of another electronic apparatus (operation S540-N), the processor 130 may identify whether the identified ambient noise corresponds to the voice of another user (operation S550).

Based on identifying that the identified ambient noise corresponds to the voice of another user (operation S550-Y), the processor 130 may perform voice recognition on the user voice input and obtain information corresponding to the voice recognition result.

In addition, the processor 130 may summarize information corresponding to the voice recognition result based on a state of the ambient noise (operation S560). Specifically, if a voice of another user is detected even after performing voice recognition on the user voice input and obtaining information corresponding to the voice recognition result, that is, if the user and the other user are in conversation, the processor 130 may summarize information corresponding to the voice recognition result using the NLG abstraction module. In addition, the processor 130 may control the speaker 120 to output the summarized information. However, this is only an example, and when the voice of the other user is detected even after obtaining the information corresponding to the voice recognition result, the processor 130 may stop an output of information corresponding to the obtained voice recognition result until the voice of the other user is not detected.

After performing voice recognition on the user voice input and obtaining information corresponding to the voice recognition result, if the voice of another user is not detected, the processor 130 may output information corresponding to the obtained voice recognition result.

Referring back to FIG. 4, the processor 130 may not detect ambient noise in the operation of receiving the user voice input (operation S440-N of FIG. 4).

In this case (operation S440-N), the processor 130 may perform voice recognition on the received user voice input (operation S450). Specifically, the processor 130 may perform voice recognition for the user voice input using a dialogue system, and obtain information corresponding to the voice recognition result as response information for the user voice.

The processor 130 may detect ambient noise around the electronic apparatus 100 while performing voice recognition on the user voice input (operation S451).

Figure 6:
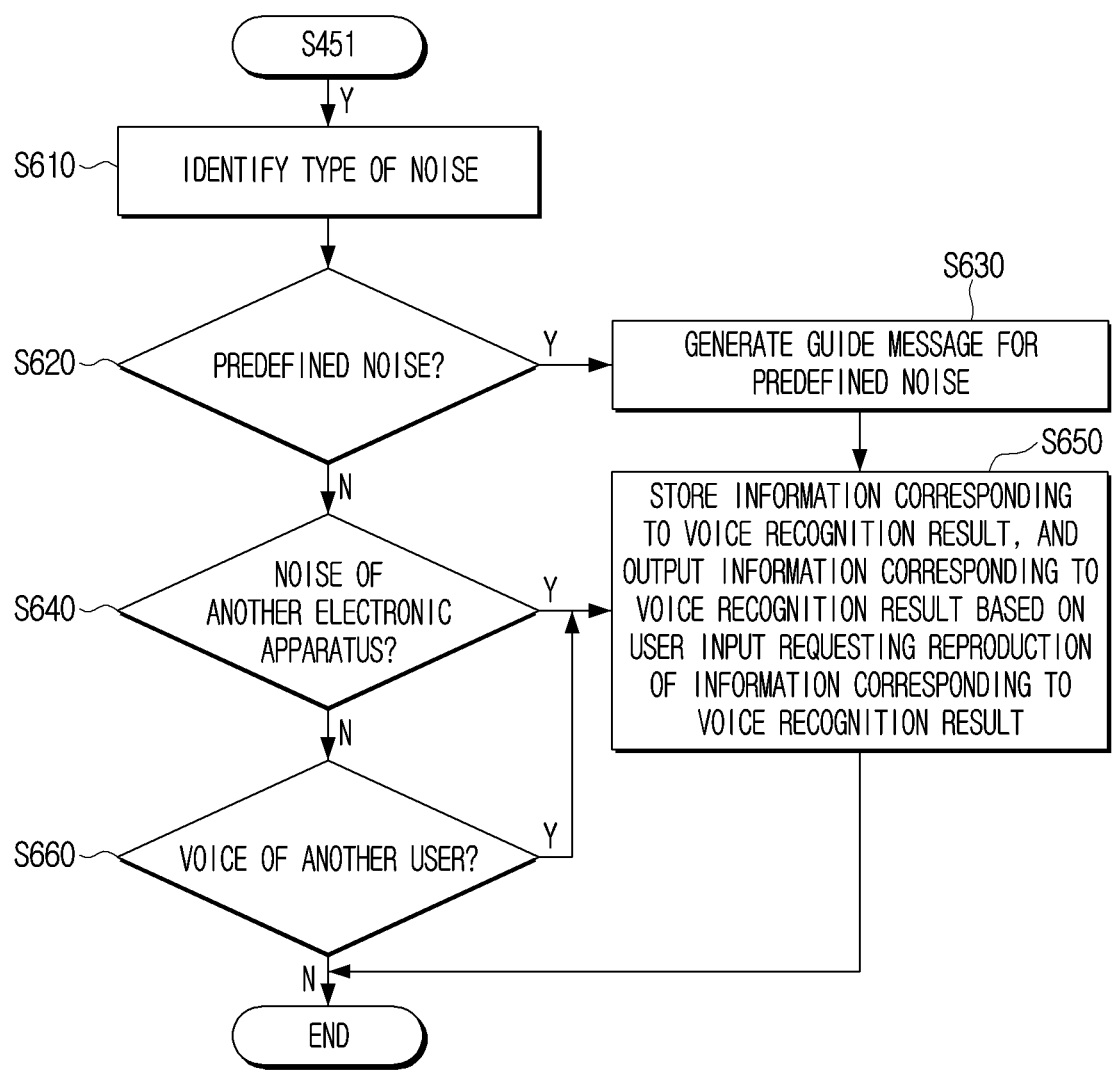
FIG. 6 is a flowchart illustrating an electronic apparatus for detecting ambient noise in a voice recognition step according to an embodiment.

FIG. 6 is a flowchart illustrating an electronic apparatus that identifies ambient noise in an operation of recognizing voice according to an embodiment of the disclosure.

If ambient noise is detected while performing voice recognition on the user voice (operation S451-Y), the processor 130 may identify the type of the detected ambient noise (operation S610). In this regard, the processor 130 may perform a similar operation as operation S510 of FIG. 5, such that a detailed description will be omitted.

When the ambient noise corresponds to a predefined noise requiring an immediate response from the user (operation S620-Y), the processor 130 may generate a guide message for the predefined noise (operation S630).

In addition, the processor 130 may perform voice recognition on the user voice input separate from the noise generation. Specifically, the processor 130 may convert the user voice signal received via the microphone 110 into a text form using an automatic voice recognition module, identify the user's intention included in the user voice using a natural language understanding module, and retrieve response information according to the user's intention using a dialog manager module when the user's intention included in the user voice is a query or information request. In addition, the response information retrieved using the natural language generation module may be converted into information in the form of natural language.

In addition, the processor 130 may store response information generated by using the natural language generation module, that is, information corresponding to the voice recognition result in the memory 140 (operation S650). In this case, the processor 130 may not immediately output information corresponding to the voice recognition result, but may output information corresponding to the voice recognition result when a predetermined condition is satisfied.

For example, the processor 130 may control the speaker 120 to output information corresponding to the voice recognition result when receiving a user voice input requesting reproduction of information corresponding to the voice recognition result. However, this is only an example, and the processor 130 may control the speaker 120 to output information corresponding to the voice recognition result when ambient noise around the electronic apparatus 100 is not detected for a predetermined time via the microphone 110.

Even when the identified ambient noise is a sound of another electronic apparatus or a voice of the other user, the processor 130 may store response information generated using the natural language generation module, that is, information corresponding to the voice recognition result, to the memory 140 (operation S650). Since the description thereof is redundant with the description above, it will be omitted for convenience of description.

The embodiment described above relates to a case in which a dialogue system is stored in the electronic apparatus 100, and as described above with reference to FIG. 1B, the dialogue system may be stored in the server 200 according to another embodiment of the disclosure.

In a case that there is a dialogue system stored in the server 200, when ambient noise around the electronic apparatus 100 is detected, the processor 130 may transmit information indicating that the ambient noise is detected in the electronic apparatus to the server 200.

In addition, the server 200 may perform voice recognition on the user voice input and store information corresponding to the voice recognition result separately from ambient noise generated around the electronic apparatus 100.

When ambient noise around the electronic apparatus 100 is not detected for a predetermined time or a user voice input requesting information corresponding to the voice recognition result is received, the electronic apparatus 100 may request information corresponding to the voice recognition result from the server 200.

When receiving a signal for requesting information corresponding to the voice recognition result from the electronic apparatus 100, the server 200 may transmit information corresponding to the voice recognition result to the electronic apparatus 100.

Referring back to FIG. 4, the processor 130 may control the speaker 120 to output information corresponding to the user voice recognition result after performing voice recognition on the user voice (operation S460).

Further, the processor 130 may identify the ambient noise around the electronic apparatus 100 using the microphone 110 while outputting information corresponding to the user voice recognition result (operation S461-Y). In addition, the processor 130 may change an output state of information corresponding to the voice recognition result based on the type of the identified ambient noise.

Figure 7:
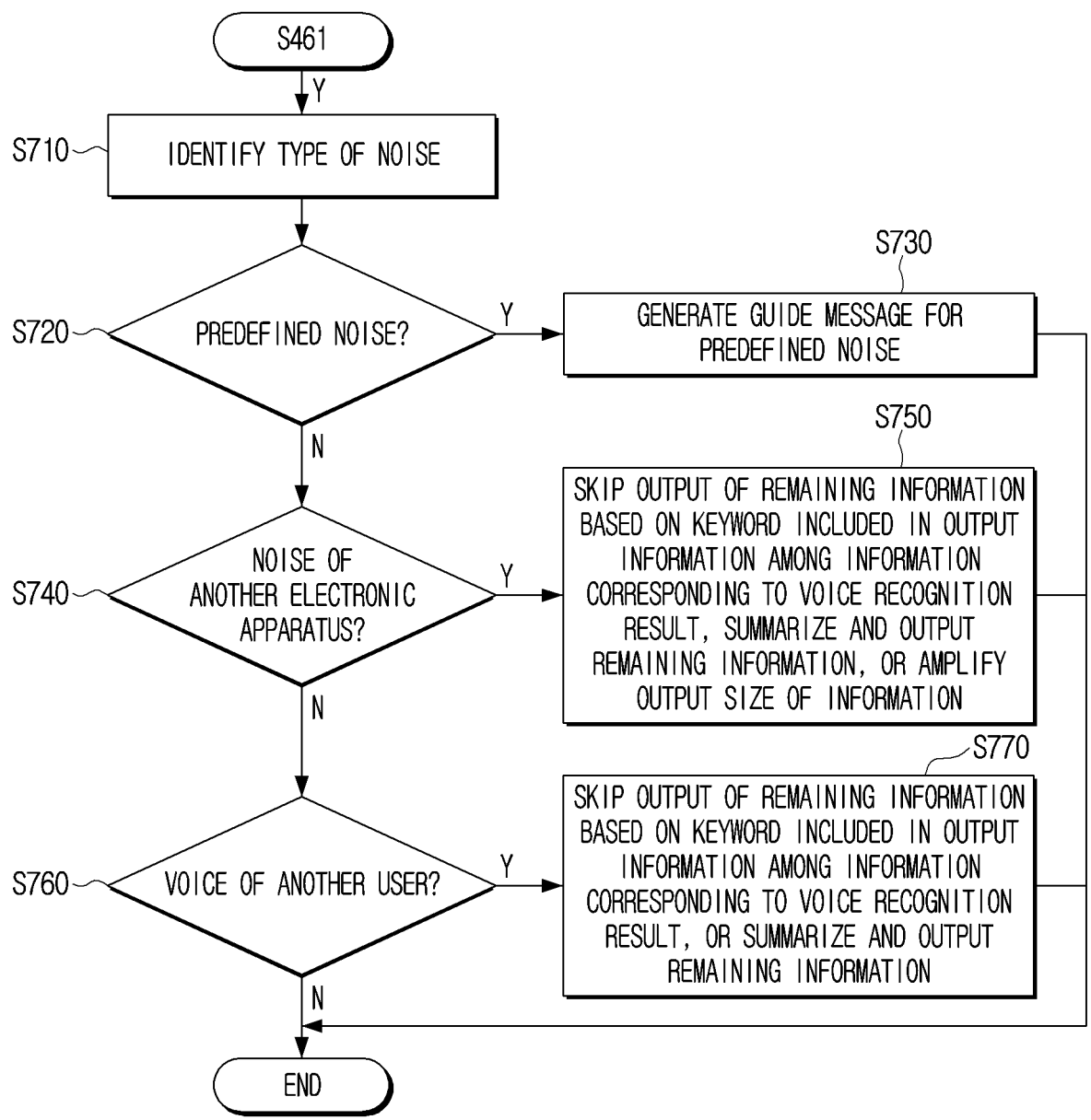
FIG. 7 is a flowchart illustrating an electronic apparatus for detecting ambient noise in a step of outputting information corresponding to a result of voice recognition according to an embodiment.

In this regard, FIG. 7 is a flowchart illustrating an electronic apparatus that identifies ambient noise in an operation of outputting information corresponding to a voice recognition result according to an embodiment of the disclosure.

Referring to FIG. 7, if the processor 130 detects ambient noise around the electronic apparatus while outputting information corresponding to the voice recognition result (operation S461-Y), the type of the detected ambient noise may be identified (operation S710). Since the description thereof is substantially similar with that of operation S510 of FIG. 5, a detailed description will be omitted.

In this case, when the type of the identified ambient noise is a predefined noise that requires the user's response, the processor 130 may control the speaker to stop outputting information corresponding to the voice recognition result and generate a guide message for the predefined noise (operation S730). Since the description thereof is substantially similar with operation S510 of FIG. 5, a detailed description will be omitted.

When the identified ambient noise corresponds to the sound of another electronic apparatus (operation S740-Y), the processor 130 may skip (prevent) the output of the remaining information based on a keyword being included in the output information among the information corresponding to the voice recognition result, or summarize and output the remaining information (operation S750).

Specifically, the processor 130 may distinguish between information output through the speaker 120 and remaining information that has not yet been output, among information corresponding to the voice recognition result.

In addition, the processor 130 may extract a keyword included in the output information based on the keyword information stored in the memory 140. Specifically, the processor 130 may identify a domain of information corresponding to the voice recognition result, and extract a keyword included in the output information by using keyword information for each domain stored in the memory 140. Further, the processor 130 may extract a keyword included in information corresponding to the voice recognition result by using keyword information for each domain.

The processor 130 may skip (prevent) the remaining information based on the extracted keyword. Specifically, the processor 130 may compare the keyword included in information corresponding to the voice recognition result with a keyword extracted from the output information. As a result of the comparison, when the keyword included in the information corresponding to the voice recognition result matches (or is the same as) the keyword extracted from the output information, the processor 130 may skip (prevent) the output of the remaining information.

However, as the result of the comparison, when the keyword included in the information corresponding to the voice recognition result is different from the keyword extracted from the output information, that is, when it is difficult to transmit information which has a same meaning as the voice recognition result only by the keyword included in the output information, the processor 130 may summarize the remaining information using the NLG abstraction module and control the speaker 120 to output the summarized remaining information.

According to another embodiment, the processor 130 may identify a noise level of another electronic apparatus (or external device), and control the speaker 120 to amplify the output size of information corresponding to the voice recognition result when the noise level of the identified external device is greater than or equal to the predetermined value.

When the type of the identified ambient noise corresponds to the voice of the other user (operation S760), the processor 130 may skip (prevent) the output of the remaining information based on the keyword included in the output information among the information corresponding to the voice recognition result, or summarize and output the remaining information (operation S770). Since this is redundant with the description of operation S750 described above, a detailed description will be omitted.

As another embodiment, when the type of the identified ambient noise is a voice of the other user, the processor 130 may control the speaker 120 to stop outputting information corresponding to the voice recognition result, and control the speaker 120 to reproduce information corresponding to the voice recognition result when a predetermined condition is satisfied. In this case, the predetermined condition may include a case of receiving a reproduction command of the user or a case when the other user voice is not detected.

In FIGS. 5 to 7, it has been described that the processor 130 performs a specific operation based on the identified ambient noise type, but is not necessarily limited to the example described above.

Specifically, an operation when a sound of another electronic apparatus is detected may be applied when a voice of the other user is detected or a predefined noise is detected. For example, when the voice of the other user is detected in FIG. 7, the processor 130 may amplify the output size of information corresponding to the voice recognition result.

Although not illustrated in detail in FIGS. 5 to 7, the processor 130 may change the output state of information corresponding to the voice recognition result based on the user's response information. Here, the user response information means response information of the user with respect to the output state of the electronic apparatus 100 when ambient noise is generated.

For this operation, the memory 140 may store an AI model obtained by learning user response information according to the type of ambient noise.

Further, the processor 130 may predict the user's response information according to the type of ambient noise by using an AI model learned based on the user's response information according to the type of ambient noise previously generated, and change the output state of information corresponding to the voice recognition result based on the predicted user's response information.

Figure 8:
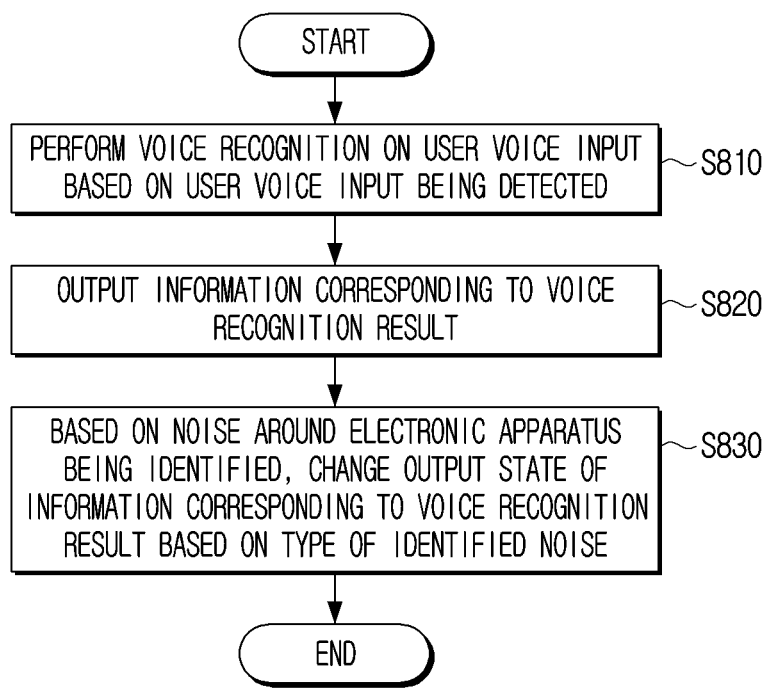
FIG. 8 is a flowchart illustrating a method for controlling an electronic apparatus according to an embodiment.

FIG. 8 is a flowchart illustrating a method of controlling an electronic apparatus according to an embodiment of the disclosure.

The electronic apparatus 100 may detect a sound around the electronic apparatus 100.

When the electronic apparatus 100 detects the user voice input, a voice recognition on the user voice (operation S810) may be performed, and information corresponding to the voice recognition result may be output (operation S820).

Ambient noise may be detected before outputting information corresponding to the voice recognition result.

According to an embodiment of the disclosure, ambient noise may be detected together with the user voice input. In other words, ambient noise around the electronic apparatus may be received at the same time as the user voice input. In this case, the user voice input and ambient noise may be distinguished through frequency analysis.

In addition, when the ambient noise is maintained even after voice recognition with respect to the user voice input is completed, information corresponding to the voice recognition result may be summarized and the summarized information may be output.

According to another embodiment of the disclosure, ambient noise may be detected in a process of performing voice recognition on the user voice input. In this case, information corresponding to the voice recognition result obtained as a result of performing voice recognition may not be immediately output, but may be stored.

In addition, when a user voice input requesting reproduction of information corresponding to the voice recognition result may be received, or when the ambient noise is not detected for a predetermined time, information corresponding to the voice recognition result may be output.

According to another embodiment of the disclosure, ambient noise may be detected in a process of outputting information corresponding to the voice recognition result.

In this case, when ambient noise around the electronic apparatus 100 is identified, the output state of information corresponding to the voice recognition result may be changed based on the type of the identified ambient noise (operation S830).

Specifically, when the ambient noise is identified, the output of information corresponding to the voice recognition result may be stopped, and output information and the remaining information that is not output may be distinguished from among the information corresponding to the voice recognition result.

Further, a keyword included in the output information may be extracted based on the keyword information, and the remaining information may be skipped (prevented from being output) based on the extracted keyword.

Specifically, a keyword included in information corresponding to the voice recognition result may be extracted based on the keyword information, and a keyword extracted from information corresponding to the voice recognition result may be compared with a keyword extracted from the output information.

As a result of the comparison, when the keyword extracted from the information corresponding to the voice recognition result matches the keyword extracted from the output information, the output of the remaining information may be skipped (prevented from being output).

As a result of the comparison, when the keyword extracted from the information corresponding to the voice recognition result is different from the keyword extracted from the output information, the remaining information may be summarized and output.

When the type of the identified ambient noise is a noise of an external device, a noise level of the external device may be identified, and when the noise level of the external device is greater than the predetermined value, an output size of the information corresponding to the voice recognition result may be amplified.

Alternatively, if the type of the identified ambient noise corresponds to a predefined noise that requires a user response, the output of information corresponding to the voice recognition result may be stopped, and a guide message for the ambient noise may be generated and output.

Alternatively, when the identified ambient noise corresponds to a voice of the other user, the output of information corresponding to the voice recognition result may be stopped, and information corresponding to the voice recognition result may be reproduced when the predetermined condition is satisfied.

The user's response information with respect to the type of the identified ambient noise may be predicted by using an AI model trained to output the user's response information according to the type of ambient noise, and based on the predicted user's response information, an output state of the information corresponding to the voice recognition result may be changed.

Various operations described as being performed through at least one of the electronic apparatus 100 or the server 200 in the above may be performed through one or more electronic apparatuses in the form of a method of controlling an electronic apparatus, or a method of controlling a system including the electronic apparatus.

Various example embodiments described above may be embodied in a recording medium that may be read by a computer or a similar apparatus to the computer by using software, hardware, or a combination thereof According to the hardware embodiment, example embodiments that are described in the disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions.

In some cases, the embodiments described herein may be implemented by the processor itself. In a software configuration, various embodiments described in the specification such as a procedure and a function may be embodied as separate software modules. The software modules may respectively perform one or more functions and operations described in the present specification.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device.

The non-transitory computer readable recording medium refers to a medium that stores data and that can be read by devices. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Also, the description of the example embodiments of the present disclosure is intended to be illustrative, and not to limit the scope of the claims, and many alternatives, modifications, and variations will be apparent to those skilled in the art.

The invention claimed is:

1. A method for controlling an electronic apparatus, the method comprising:
   detecting a voice input of a user;
   based on the detecting the voice input of the user, performing voice recognition with respect to the voice input of the user;
   outputting information corresponding to a result of the voice recognition;
   identifying a type of ambient noise detected by the electronic apparatus;
   changing an output state of the information corresponding to the result of the voice recognition based on the type of the ambient noise,
   wherein the method further comprises:
   based on the identifying the type of the ambient noise, stopping the outputting of the information corresponding to the result of the voice recognition;
   classifying output information that has been output and remaining information that has not been output from the information corresponding to the result of the voice recognition; and
   extracting a first keyword included in the output information based on keyword information, and
   wherein the changing the output state comprises preventing outputting of the remaining information based on the first keyword.

2. The method of claim 1, further comprising:
extracting a second keyword included in the information corresponding to the result of the voice recognition based on the keyword information; and
comparing the second keyword extracted from the information corresponding to the result of the voice recognition with the first keyword extracted from the output information,
wherein the changing the output state further comprises preventing the outputting of the remaining information based on the second keyword extracted from the information corresponding to the result of the voice recognition matching the first keyword extracted from the output information.

3. The method of claim 1, further comprising:
extracting a second keyword included in the information corresponding to the result of the voice recognition based on the keyword information; and
comparing the second keyword extracted from the information corresponding to the result of the voice recognition with the first keyword extracted from the output information,
wherein the changing the output state comprises summarizing and outputting the remaining information based on the second keyword extracted from the information corresponding to the result of the voice recognition not matching the first keyword extracted from the output information.

4. The method of claim 1, further comprising:
based on identifying the ambient noise as a noise of an external device, identifying a noise level of the external device,
wherein the changing the output state comprises amplifying an output level of the information corresponding to the result of the voice recognition based on the noise level of the external device being greater than or equal to a predetermined value.

5. The method of claim 1, wherein the changing the output state comprises:
based on identifying that the ambient noise corresponds to a predefined noise requiring a response of the user, stopping the outputting of the information corresponding to the result of the voice recognition, and generating and outputting a guide message with respect to the ambient noise.

6. The method of claim 1, wherein the changing the output state comprises stopping the outputting of the information corresponding to the result of the voice recognition based on identifying that the ambient noise corresponds to a voice of another user, and
wherein the method further comprises reproducing the information corresponding to the result of the voice recognition based on a predetermined condition being satisfied.

7. The method of claim 1, further comprising:
predicting user response information with respect to the type of the ambient noise using an artificial model trained to output the user response information according to the type of the ambient noise,
wherein the changing the output state comprises changing the output state of the information corresponding to the result of the voice recognition based on the predicted user response information.

8. The method of claim 1, further comprising:
identifying the ambient noise while performing the voice recognition with respect to the voice input of the user; and
storing the information corresponding to the result of the voice recognition,
wherein the outputting comprises outputting the information corresponding to the result of the voice recognition based on receiving a user input requesting reproduction of the information corresponding to the result of the voice recognition.

9. The method of claim 1, further comprising:
detecting the ambient noise; and
distinguishing the voice input of the user and the ambient noise using a frequency analysis,
wherein the changing the output state comprises summarizing the information corresponding to the result of the voice recognition and outputting the information based on the ambient noise being maintained.

10. An electronic apparatus comprising:
a microphone configured to detect sound;
a memory configured to store keyword information;
a speaker; and
a processor configured to:
based on detecting a voice input of a user via the microphone, perform voice recognition with respect to the voice input of the user;
control the speaker to output information corresponding to a result of the voice recognition;
identify a type of ambient noise detected by the microphone; and
change an output state of the information corresponding to the result of the voice recognition based on the type of the ambient noise,
wherein the processor is further configured to:
based on identifying the type of the ambient noise, stop the output of the information corresponding to the result of the voice recognition,
classify output information that has been output and remaining information that has not been output from the information corresponding to the result of the voice recognition, and
extract a first keyword included in the output information based on the keyword information, and
wherein the processor is further configured to, when changing the output state, prevent output of the remaining information based on the first keyword.

11. The electronic apparatus of claim 10, wherein the processor is further configured to:
extract a second keyword included in the information corresponding to the result of the voice recognition based on the keyword information; and
compare the second keyword extracted from the information corresponding to the result of the voice recognition with the first keyword extracted from the output information, wherein the processor is configured to, when changing the output state, prevent an output of the remaining information based on the second keyword extracted from the information corresponding to the result of the voice recognition matching the first keyword extracted from the output information.

12. The electronic apparatus of claim 10, wherein the processor is further configured to:
extract a second keyword included in the information corresponding to the result of the voice recognition based on the keyword information; and
compare the second keyword extracted from the information corresponding to the result of the voice recognition with the first keyword extracted from the output information, and wherein the processor is configured to, when changing the output state, summarize the remaining information and control the speaker to output the remaining information based on the second keyword extracted from the information corresponding to the result of the voice recognition not matching the first keyword extracted from the output information.

13. The electronic apparatus of claim 10, wherein the processor is further configured to:
  based on identifying that the type of the ambient noise is a noise of an external device, identify a noise level of the external device, and
  wherein the processor is configured to, when changing the output state, control the speaker to amplify an output level of the information corresponding to the result of the voice recognition based on the noise level of the external device being greater than or equal to a predetermined value.

\* \* \* \* \*